Figure 1:
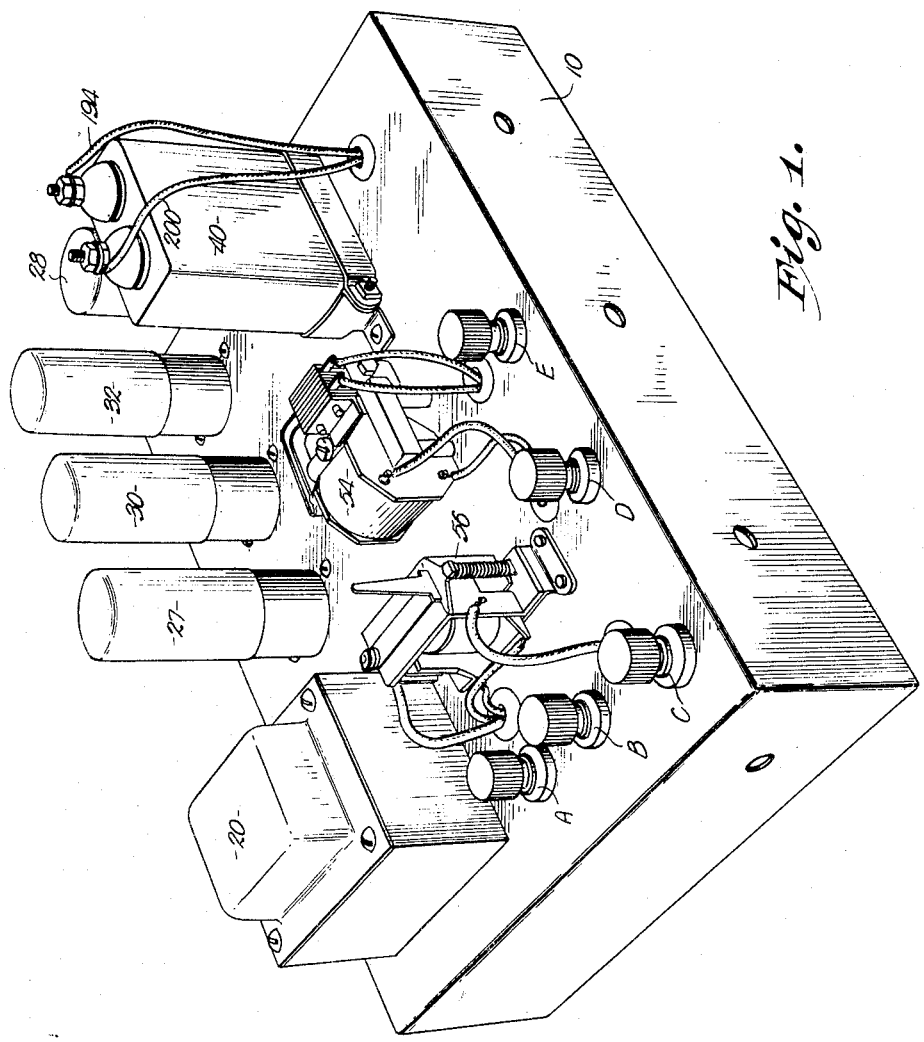

Jan. 23, 1951  O. J. SCHOMMER  2,538,881
AUTOMATIC TIMER FOR WELDING MACHINES
Filed July 27, 1945  2 Sheets-Sheet 1

INVENTOR.
Oliver J. Schommer
BY
ATTORNEY

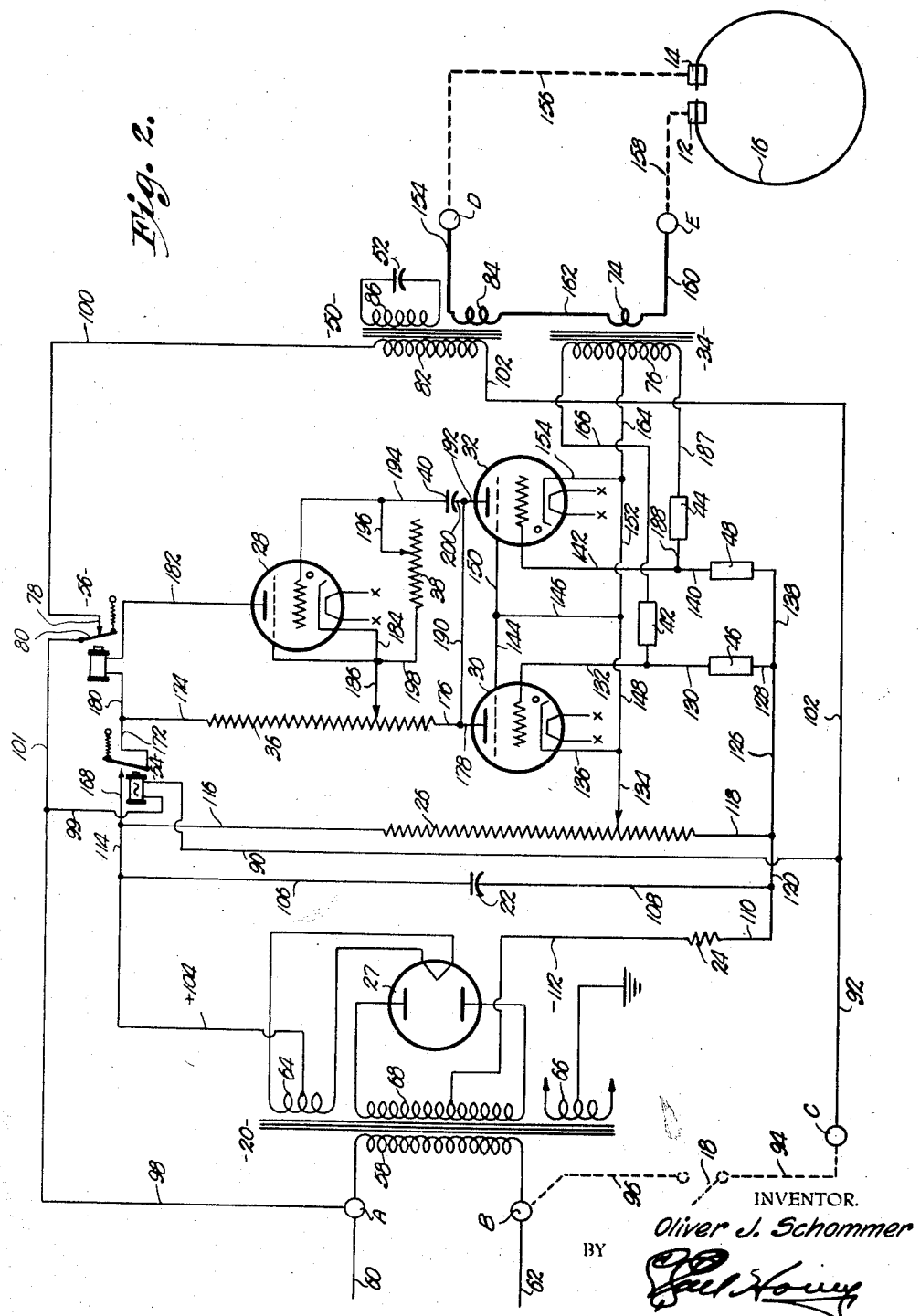

Patented Jan. 23, 1951

2,538,881

UNITED STATES PATENT OFFICE

2,538,881

AUTOMATIC TIMER FOR WELDING MACHINES

Oliver J. Schommer, Melrose Park, Ill., assignor, by direct and mesne assignments, to C. Earl Hovey, Kansas City, Mo., as trustee Application July 27, 1945, Serial No. 607,309

5 Claims. (Cl. 175—320)

1

This invention relates to timing equipment for welding machines and has for a primary aim to provide means for controlling the duration of the welding period after the material being welded has been brought into contact.

Another important object of the invention is the provision of apparatus for accurately timing an interval during which actual welding of material occurs and through which material current is passing from the time it is introduced to the welding machine.

A still further object of the invention is to provide timing equipment for electric welding machines wherein the ends of a length of conducting material are fused, which length of material constitutes a portion of the electric circuit of the welding machine from the time the material is introduced to the machine.

A yet further object of my invention is to provide an automatic timer for welding machines, capable of accurately controlling flow of current for periods as low as a single cycle of a 60 cycle alternating electrical current.

Other objects of the invention are to provide a welder timer wherein the rise in potential of the secondary coil of a control transformer is employed to cause one of a pair of tubes to condition the system for charging a timing condenser through the action whereof the length of the welding time is determined; and wherein timing is always started during the first half cycle after the parts being welded are brought together.

Other objects of the invention of an important nature, will appear during the course of the following specification, referring to the accompanying drawings, illustrating the manner of combining the component parts of the apparatus in such fashion as to accomplish a more desirable result than has heretofore been obtained.

Because the invention has been embodied in pilot models that performed satisfactorily, the form of invention chosen for illustration is shown in the accompanying drawings; wherein Fig. 1 is a perspective, pictorial illustration of the timer for welding machines, made in accordance with the present invention; and Fig. 2 is a diagrammatic view, schematically illustrating the manner of associating the component parts of the apparatus.

In actual application, the timer assumes the form of a unitary instrument having the general appearance of that illustrated in Fig. 1. Convenience of attachment to the welding machine results from the production of the timer in such fashion, and replacement of parts is rendered easy as is the task of renewing an entire timer, in the event such becomes necessary.

Any suitable framework or chassis 10 may be employed so long as it is capable of mounting the elements of the timer where connections are possible.

This chassis 10 is an inverted, box-like base with parts on top and additional elements housed therein.

The welding machine with which the timer unit, illustrated in Fig. 1, is combined, includes jaws 12 and 14, serving as electrodes as well as means for engaging the end of the metallic material 16. The ends of wire 16 are butted together by jaws 12 and 14 as they are moved toward and from each other through the actuation of the welding machine of conventional character, not here shown.

A cam switch 18 likewise forms a portion of the welding machine, is operated thereby, and periodically opened and closed. The timing of the switch 18 is synchronized with the movement of jaws 12 and 14, to the end that switch 18 is closed before the ends of wire 16 are brought together. It is reopened after welding is completed, and just before the jaws 12 and 14 release their hold upon the material.

The timer essentially comprises a transformer 20, a condenser 22, resistors 24 and 26, tubes 27, 28, 30 and 32, transformer 34, resistors 36 and 38, condenser 40, resistors 42, 44, 46 and 48, transformer 50, condenser 52, and relays 54 and 56.

Suitable wires of conducting material are employed to operatively interconnect the main elements of the timer, as above designated by their respective numerals. Such connections and the functions of the entire assembly will be set down after a full explanation of the characteristics of parts 20 to 56 inclusive.

Transformer 20 is of conventional character. It is of the radio type used in supplying power and is wound for 115 volt, 60 cycle supply, that is introduced to its primary winding 58 through supply lines 60 and 62. Secondary winding 64 of transformer 20 is a center tapped 5 volt coil; secondary winding 66 of transformer 20, is a center tapped 6.3 volt coil; and secondary winding 68 of transformer 20, is a center tapped 700 volt coil. The function of transformer 20 and its component parts is to provide current to heat the filaments of tubes 28, 30 and 32, and to provide a direct current high voltage supply for the entire assembly.

Condenser 22 is a two micro-farad, 600 volt unit, serving to reduce the ripple produced in the system. Such ripples occur where A. C. is rectified, and therefore, this condenser 22 is placed as illustrated in Fig. 2.

Resistor 26 serves as a stabilizing resistor and also provides an adjustable tap for setting the amount of grid bias on the control grid of tubes 30 and 32. Resistor 26 is a 10,000 ohm, wire wound, 50 watt adjustable resistor.

Resistor 24 is employed in reduce the value of the current surges on the rectifier tube 27. This resistor 24 is 1,000 ohm, 25 watt wire wound.

Tubes 30 and 32 are gas filled thyratrons, serving as means for starting the timing function when they are fired to conduct a current at the instant their grid voltage reaches a critical negative value. This critical value is approached when the ends of material 16 are brought together through the medium of transformer 34. A fixed amount of direct current voltage is applied to the grids of tubes 30 and 32, so that they are negative with respect to their cathodes to prevent these tubes 30 and 32 from conducting, even when current is passing through material 16.

When the ends of material 16 are brought together by movement of jaws 12 and 14, the current through the primary coil 74 of transformer 34, increases to a value high enough to provide a voltage in secondary coil 76 of sufficient amplitude to cause the grid of either tube 30 or 32 to reach a small negative value, whereupon these tubes will conduct current. The first tube to fire depends upon the direction of the current flowing through transformer 34 at the instant the grids reach that negative value permitting the tube to conduct. In this fashion, the timed period is always started during the first half of the cycle after the two ends of material 16 are brought together.

Tube 28 is of the same character as tubes 30 and 32, so far as its construction is concerned, and it is used to energize relay 56 when the end of the timing cycle is reached. Resistor 36 provides proper grid bias for the tube 28, and provides also a conducting path which enables the operation of tubes 30 and 32.

Condenser 40 charged by resistor 38 holds the control grid of tube 28 in a negative condition, with respect to the cathode of tube 28, following the time that tubes 30 and 32 start to conduct until condenser 40 becomes charged to a value equal to the critical value of the control grid voltage approaching the cathode potential in the tube 28. When this critical value is reached, tube 28 will conduct current and energize relay 56. Contact points 78 and 80 of relay 56 will be opened from their normally closed condition, and the welding current through the primary coil 82 of transformer 50 stopped to prevent heat producing energy from reaching clamps or electrodes 12 and 14.

In other words, current flowing from the anode of tube 30 or 32, as the case may be, starts the charging of condenser 40. As soon as the voltage in condenser 40 reaches a critical value as determined in time by resistance 38, tube 28 starts to conduct, and current from its anode passes through the coil of relay 56 to open its contacts 78 and 80. This opening of contacts 78 and 80 de-energizes transformer 50 to terminate the welding current. Thus, the timing condenser 40 is effective to maintain tube 28 blocked prior to charging thereof to a voltage sufficient to permit tube 28 to become conductive, thereby energizing relay 56 and terminating flow of current to the primary of transformer 50.

Resistors 42, 44, 46 and 48 permit the control grids in tubes 30 and 32 to be operated on a relatively small amount of current—thus, the voltages may be superimposed as they are produced by transformer 34, making possible the firing of tubes 30 and 32. These four resistors also prevent the control grids from drawing any excessive amounts of current while tubes 30 and 32 are conducting.

Transformer 50 is a welding type transformer with one secondary coil 84 connected to jaws 12 and 14, and coil 74 of transformer 34, as shown in Fig. 2. A winding 86 is used in connection with capacitor 52 connected as illustrated. The function of this capacitor or condenser 52 is to change the transformer output wave shape from a normal sine wave to one more nearly representing that of a half wave rectified A. C. current. Experimentation and tests have indicated that this changed wave shape produced a superior weld at the ends of material 16.

Relays 54 and 56 are interposed as indicated, and the former is an auxiliary relay operating directly on the A. C. supply line. It closes when the machine operated cam switch 18 is shifted to a closed position. At the end of the timing or welding period, relay 56 opens to terminate the welding action, as above set forth. Following this opening of relay 56, cam switch 18 is opened by the mechanical operation of the welding machine, whereupon relay 54 is reopened to terminate the current conducting function of all the tubes 28, 30 and 32. Such is the condition of the apparatus at the end of a complete cycle of operation.

Tubes 28, 30 and 32 are obtainable on the open market and during the development of the timing equipment, RCA tube type 2050 was used. These tubes are of the gas filled type and prior to "firing" and conducting, the control grid maintains complete control. Once conduction occurs, however, the grid loses all control.

When the instrument illustrated in Fig. 1 is to be put into operation with the welding machine, terminals A and B are connected to supply lines 60 and 62 respectively, extending from a suitable source of electrical current of 115 volt, 60 cycle character.

During the mechanical operation of the machine, cam switch 18 is closed and relay 54 closes its contacts through the following circuit:

From supply line 60 through connecting post A to wires 98 and 99, coil of relay 54, wire 90, wire 92 to terminal post C, wire 94, closed switch 18, wire 96, terminal post B to line 62.

Wires 94 and 96 extend from the welding machine and its cam operated switch 18 and are joined to the unit by connecting them to terminal posts B and C. The starting and timing circuits are now prepared for operation.

When switch 18 closes, power is applied to the primary coil 82 of transformer 50 through the following circuit:

Supply line 60, wire 98, wire 101 to normally closed contacts 80 and 78 of relay 56, wire 100 to coil 82, thence through wire 102, wire 92, terminal post C, wire 94, cam switch 18 (closed), wire 96, terminal post B to line 62.

Direct current voltage produced by the rectifier is flowing as follows:

From wire +104, wire 106, condenser 22, wire 108, wire 110, resistor 24 to wire —112.

Direct current is also flowing from wire +104 through wire 114, wire 116, resistor 26, wire 118, wire 120, wire 110, resistor 24 and wire —112.

Because current is flowing through resistor 26, the control grids of tubes 30 and 32 are maintained at a negative potential with respect to their cathodes thus preventing tubes 30 and 32 from conducting.

Prior to the closing of cam switch 18, the negative potential on the grids of these tubes is approximately 21 volts. Due to A. C. voltage imposed on these same control grids of tubes 30 and 32 by the output of transformer 34, the voltage will vary from 4.5 to 21 volts negative with respect to the cathodes.

The maintained negative control grid bias is supplied to tube 30 through the following circuit:

Wire —112, resistor 24, wire 110, wire 120, wire 126, wire 128, resistor 46, wire 130, wire 132 to the control grid of tube 30.

The cathode voltage of tube 30 is connected more postively than the control grid as follows:

Wire +104, wire 114, wire 116, part of resistor 26, wire 134, wire 136, to the cathode of tube 30.

The maintained negative control grid bias is supplied to tube 32 through the following circuit:

Wire —112, resistor 24, wire 110, wire 120, wire 126, wire 138, resistor 48, wire 140, wire 142 to the control grid of tube 32.

The cathode voltage of tube 32 is traced as follows:

Wire +104, wire 114, wire 116, part of resistor 26, wire 134, wire 148, wire 152, wire 154 to the cathode of tube 32.

Since there is no current flowing through either tubes 30 or 32, no voltage is developed across the resistor 36, and therefore, tube 28 is without any potential difference between any of the tube elements. The contacts of relay 54 are, however, closed and keep the tube 28 ready to operate immediately following the conduction of either of tubes 30 or 32.

The shield grid in tube 30 is maintained at cathode potential through the following conductors:

From the shield grid of tube 30 through wire 144, wire 146, wire 148, wire 136, to the cathode in tube 30.

The shield grid in tube 32 is maintained at cathode potential through the following conductors:

From the shield grid in tube 32 through wire 150, wire 146, wire 152, wire 154 to the cathode in tube 32.

Before the ends of material 16 are brought together, the grids of tubes 30 and 32 are of the proper negative value through adjustment of wire 134 along resistor 26. The value of the A. C. voltage produced by the transformer 34 does not reach a sufficiently high positive value to bring the control grids of tubes 30 and 32 to the critical value. The combined D. C. voltage through such adjustment and the A. C. component produced by transformer 34 will not be sufficiently high to cause tubes 30 or 32 to operate until such time as the ends of material 16 are brought together.

At this point, the ends of material 16 have come together and as the welding machine progresses through its operation and the jaws 12 and 14 are shifted to move the ends of material 16 into abutting condition, the current will rapidly increase. The instant the ends of material 16 come together, the direction of flow may be as follows:

From secondary coil 84 of transformer 50 through wire 154 to terminal post D, wire 156 (forming a part of the connection between the welding machine and the timing instrument) to jaw 14, through the contacted ends of material 16 to jaw 12, wire 158, terminal post E, wire 160, primary coil 74, of transformer 34, wire 162, and back to the secondary coil 84 of welding transformer 50.

Within one-half cycle after the ends of material 16 make contact, either tube 30 or 32 will receive a value of critical grid voltage and commence conducting current. This action will start the period of time to be controlled.

Due to the direction of flow of current, as above set down, the control grid of tube 30 will receive a positive cancellation of its maintained negative control grid bias from transformer 34 through the following circuit:

From the cathode of tube 30, through wire 136, wire 148, wire 152, wire 164, through the upper half of secondary winding 76 of transformer 34, thereby stepping the voltage upward in a positive direction, through wire 166, resistor 42, wire 132 to the control grid of tube 30.

The net control voltage is increased by bringing together the ends of material 16. Such increased voltage is caused by the reduction in resistance upon bringing together of the ends of material 16 and because of increased voltage through winding 74 of transformer 34 as set forth above.

This flow of current will cause tube 30 to "fire" and conduct, and a current will flow through the following circuit:

From line +104, through wire 114, wire 168, closed contacts of relay 54, wire 172, wire 174, resistor 36, wire 176, wire 178 to the anode of tube 30, thence through tube 30 to the cathode of this tube and then out through wire 136, wire 134 to a part of resistor 26, wire 118, wire 120, wire 110, resistor 24, and to wire —112.

The closing of the circuit and the passing of energy through the conductors and instruments as just above set forth, will cause a current to flow through resistor 36 to cause a potential to exist thereacross, thereby starting the timing action of condenser 40. When the charge across the condenser 40 reaches a critical value, the tube 28 will fire and conduct, which will operate relay 56 in the following manner:

From wire +104 through wire 114, wire 168, closed contacts of relay 54, wire 172, wire 180, the coil of relay 56, wire 182, the anode of tube 28 through tube 28 to its cathode through wire 184, wire 186, through part of resistor 36, wire 176, wire 178 to anode of tube 30, thence through this tube to its cathode, wire 136, wire 134 through a part of resistor 26, wire 118, wire 120, wire 110, resistor 24, and wire —112.

The control unit never uses both tubes 30 and 32 and their use is determined by the direction of the current at the moment the ends of the material 16 make contact. As a result of the circuit just traced, tube 33 was used as the conductor, but if the current had been flowing in an opposite direction from that defined above, when it was assumed that the ends of the material 16 had come into contact, then tube 32 would have been the conductor.

As a result of the flow of current as just above described, voltage is flowing through transformer 34 as follows:

From the cathode of tube 32 wire 154 to wire 164, through the lower half of secondary coil 76 of transformer 34, wire 187, resistor 44, wire 188, wire 142 to the control grid of tube 32.

The D. C. control grid voltage is cancelled out and tube 32 is caused to fire and conduct. This action will cause a current to flow as follows:

From line +104 through wire 114, wire 168, closed contacts of relay 54, wire 172, wire 174, resistor 36, wire 176, wire 190, wire 192 to the anode of tube 32, thence through tube 32 to its cathode and then through wire 154, wire 152, wire 148, wire 134, part of resistor 26, wire 118, wire 120, wire 110, resistor 24 to wire −112.

Because of the establishment of the above circuit, tube 28 will now conduct and energize relay 56 after the condenser 40 reaches a critical value in voltage. Thereafter, the same action will take place as above described, when it was explained that the timing action of condenser 40 was started due to the flow of current through resistor 36 to cause a potential to exist thereacross to start said timing action.

After the relay 56 opens its contacts, the welding is stopped and the weld at the ends of the material 16, is cooled. The cam switch is reopened by the mechanical action of the welding machine and the jaws are released to free material 16. The welding machine and the timer is now in the condition present at the beginning of the cycle.

Condenser 40 is discharged between each cycle of operation through the following circuit:

Wire 194, wire 196, resistor 38, wire 198, wire 186, part of resistor 36, wire 176, wire 190, wire 200 to the opposite side of condenser 40.

It is clear that prior to firing of tubes 30 and 32, tube 28 is actually inactive, since there is no potential difference between any of its elements. Such elements, together with all parts of condenser 40 and the anodes of tubes 30 and 32 are at the same potential. Tube 28 is not, therefore, blocked in the same manner as tubes 30 and 32. Blocking of tube 28 takes place the moment either tube 30 or 32 is fired, and obviously, in the absence of condenser 40, tube 28 would operate to energize relay 56 immediately upon firing of tube 30 or tube 32. Condenser 40 resists immediate voltage change however, thereby holding tube 28 at cut-off for a predetermined period of time. As condenser 40 commences to charge through resistor 38, the critical difference in voltage between the cathode and grid of tube 28 will cause the latter to conduct.

It is to be remembered that tubes 30 and 32 serve as a means to start the timing function the moment either of their grid voltages reach a predetermined voltage. Even though current is flowing through loop 16, the D. C. voltage applied to the grids of tubes 30 and 32 is sufficient to hold the same sufficiently negative with respect to their cathodes to maintain tubes 30 and 32 at cut-off.

When the ends of loop 16 are brought together, current through primary 74 of transformer 34 increases to a value high enough to provide a secondary voltage for rendering either the grid of tube 30 or the grid of tube 32 sufficiently less negative with respect to the corresponding cathode thereof to cause firing.

The net voltage, therefore, on the grids of tubes 30 and 32, is the direct current bias by means of resistor 26 and the A. C. voltage fed into this network from winding 76 of transformer 34.

Operation of the timer depends upon the choosing of tubes 28, 30 and 32 and they must be of such nature as to continue conducting as long as the proper direct current potential difference (voltage) exists between their anodes and cathodes. The fact that opening of the circuit through energization of relay 56, terminates flow of current through transformer 34, has no bearing since tube 30 or 32 will continue charging regardless of change in voltage on their control grids. It is for this reason that relay 54 is necessary to interrupt the flow of D. C. current to tubes 30 and 32, stop conducting thereof and prepare the circuit for subsequent cycles of operation.

Having thus described the invention, what is claimed as new and desired to be secured by Letters Patent is:

1. In a welding system, a welding circuit and a welding period timing means including an electric control tube having a grid and an anode-cathode circuit provided with a resistance in series therewith; means for biasing the grid of said tube negatively with respect to its cathode to normally maintain the tube non-conducting; an electric timing valve having a grid load resistor and an anode-cathode circuit coupled through a portion of said resistance and in series with the anode-cathode circuit of said tube whereby the valve is normally rendered non-conducting; means coupling said welding circuit with the control tube for reducing the negative grid bias thereon in response to current flow in said welding circuit; a resistance-capacitance timing circuit coupled through said portion of said first mentioned resistance for holding the valve against firing for a predetermined period of time only, after firing of the control tube in response to said reduction of negative grid bias, said timing circuit being in parallel with the anode-cathode circuit of said tube and including a capacitor and said grid load resistor in series therewith; and means having parts coupled with the valve and adapted to be energized thereby for opening the welding circuit upon firing of the valve.

2. In a welding system as set forth in claim 1 wherein said means coupling the welding circuit includes a transformer having a winding in the welding circuit and a winding in series with the grid and the cathode of said tube.

3. In a welding system, an alternating current welding circuit and a welding period timing means including a pair of electric control tubes each having a grid and an anode-cathode circuit, the latter being connected in parallel and having a resistance in series therewith; means for biasing the grids of said tubes negatively with respect to the corresponding cathodes thereof to normally maintain the tubes non-conducting; an electric timing valve having a grid load resistor and an anode-cathode circuit coupled through a portion of said resistance and in series with the anode-cathode circuits of said tubes whereby the valve is normally rendered non-conducting; a transformer having a primary in the welding circuit and a secondary having each end thereof connected with a respective tube grid and center coupled with the cathodes of said tubes whereby to alternately reduce the grid bias of said tubes as the direction of current flow in the welding circuit changes; a resistance-capacitance timing circuit coupled through said portion of said first mentioned resistance for holding the valve against firing for a predetermined period of time only, after firing of one of the control tubes in response to said reduction of negative grid bias, said timing circuit being in parallel with the anode-cathode circuits of said tubes and including a capacitor and said grid load resistor in series therewith; and means having parts coupled with the valve and adapted to be energized thereby for opening the welding circuit upon firing of the valve.

4. In a welding system as set forth in claim 3 wherein said grid load resistor is variable whereby to render the welding period time selective.

5. In a welding system as set forth in claim 3 wherein said first mentioned resistance is adjustable for varying the grid bias of said tube between the time of firing of the control tube and the time of firing of the timing tube.

OLIVER J. SCHOMMER.

REFERENCES CITED

The following references are of record in the file of this patent:

UNITED STATES PATENTS

| Number | Name | Date |
| --- | --- | --- |
| 1,871,787 | Goldsborough | Aug. 16, 1932 |
| 2,008,413 | Dawson | July 16, 1935 |
| 2,019,027 | Stansberry | Oct. 29, 1935 |
| 2,024,542 | Simon | Dec. 17, 1935 |
| 2,083,190 | Dawson | June 8, 1937 |
| 2,202,722 | Anderson | May 28, 1940 |
| 2,227,285 | Stansberry | Dec. 31, 1940 |
| 2,264,067 | Chambers | Nov. 25, 1941 |
| 2,363,753 | Smith | Nov. 28, 1944 |
| 2,441,789 | Bivens | May 18, 1948 |

FOREIGN PATENTS

| Number | Country | Date |
| --- | --- | --- |
| 444,113 | Great Britain | Mar. 16, 1936 |